United States Patent [19]

Boomer

[11] 4,213,941
[45] Jul. 22, 1980

[54] SOLVENT IMMERSION EXTRACTOR

[76] Inventor: Merton E. Boomer, 1473 Vista Grand Dr., San Leandro, Calif. 94577

[21] Appl. No.: 965,986

[22] Filed: Dec. 4, 1978

[51] Int. Cl.² ............................................. B01D 11/02
[52] U.S. Cl. ................... 422/267; 422/268; 422/273; 422/281; 99/516
[58] Field of Search ............... 422/267, 268, 273, 281, 422/274, 275; 99/516, 536

[56] References Cited

U.S. PATENT DOCUMENTS

| | | | |
|---|---|---|---|
| 608,554 | 8/1898 | Moodie | 422/267 |
| 1,024,230 | 4/1912 | Turner et al. | 422/273 |
| 1,628,787 | 5/1927 | Kennedy | 422/273 |
| 1,862,945 | 6/1932 | Schotterhose | 422/273 |
| 2,227,605 | 1/1941 | Swallen et al. | 422/268 |
| 2,501,880 | 3/1950 | Sweeney et al. | 422/273 |
| 2,552,524 | 5/1951 | Cunningham | 422/267 |
| 2,582,675 | 1/1952 | Bonotto | 422/273 |
| 2,703,274 | 3/1955 | Giesse et al. | 422/273 |
| 3,597,163 | 8/1971 | Van Hengel | 422/281 |
| 4,101,285 | 7/1978 | Tilby | 422/268 |

Primary Examiner—Frank W. Lutter
Assistant Examiner—Gregory N. Clements
Attorney, Agent, or Firm—Warren, Chickering & Grunewald

[57] ABSTRACT

The immersion extractor is designed for use with a solid material containing an extractable component and includes a plurality of adjacent chambers each formed to contain a liquid solvent bath for extracting the component from the material and a continuous conveyor for displacing the material through the chambers. Partitions are used to define substantially vertical entryways for the conveyor at one side of the chambers and substantially vertical exitways for the conveyor at the opposite side of the chambers thus maintaining between the entryway and exitway of each container a quiescent solvent surface which is decanted for removal of solvent and dissolved component. A single continuous conveyor is used and the return leg of the conveyor is structured to carry out a final percolation-type extraction of the extractable component.

6 Claims, 1 Drawing Figure

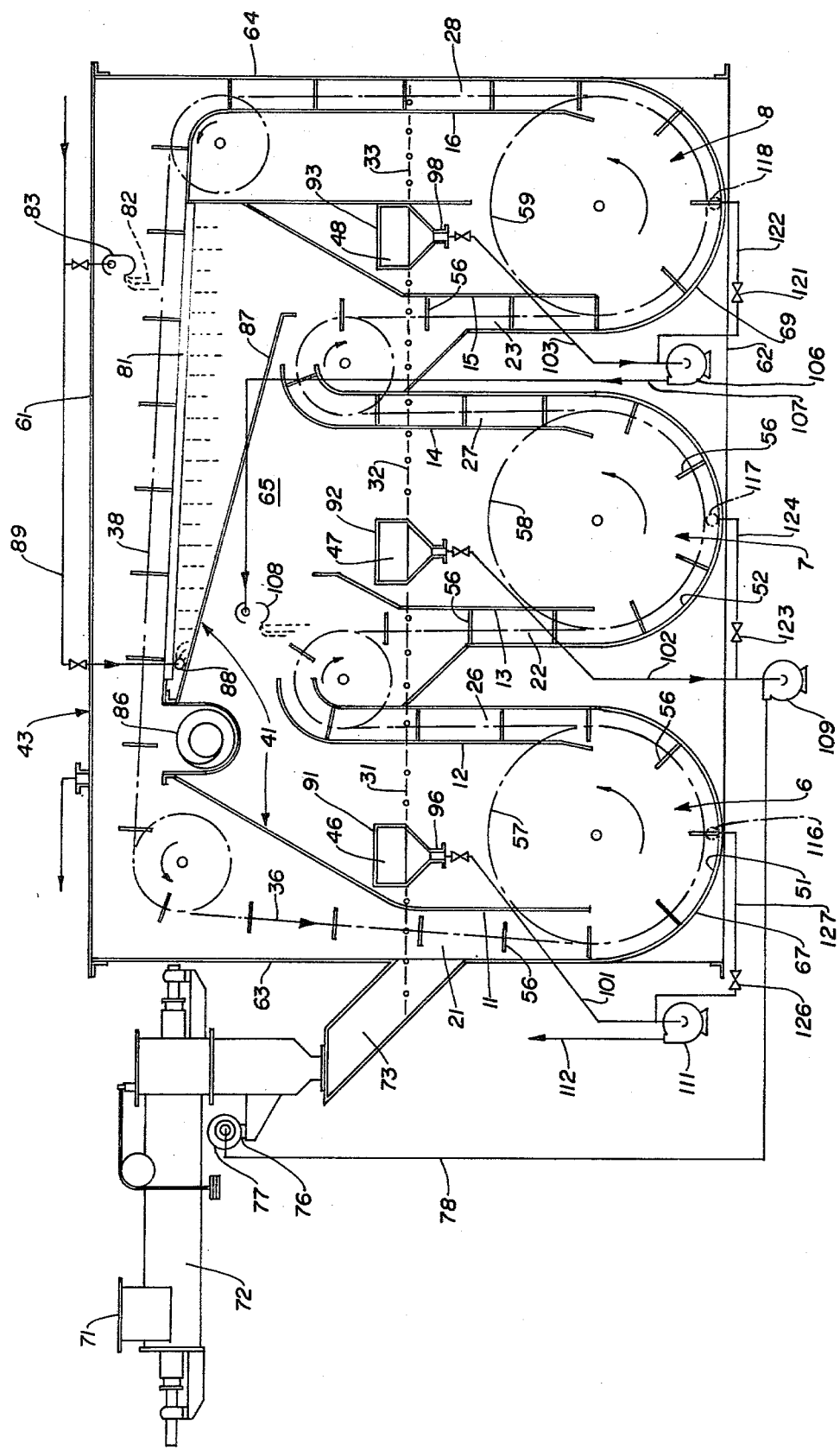

SOLVENT IMMERSION EXTRACTOR

BACKGROUND OF THE INVENTION

1. Field of Invention

The invention relates to solvent extractors commonly used for the removal of oils, fats and waxes from solid material such as oil-bearing seeds, hops, lignite, rice bran, etc. The solvent will depend on the component to be extracted. Hexane, alcohol, blend of alcohol and toluene, chlorinated solvent are typical. Water may be used where it is a satisfactory solvent for removing the extractable component, e.g. the extraction of proteins from meal. Generally, the present invention relates to extractors for extracting a component that can be soaked or leached out of a solid material.

More particularly, the present extractor is designed for use with material which does not lend itself to extraction by the so-called percolation method. Percolation extractors are dependent on granular material or material that has voids permitting the solvent or the leaching media to drain through the solids. Some materials are too finely divided resulting in a very dense bed that does not lend itself to the percolation or the transfer of solvents from the surface on through the bed of the material. This may also occur where the material is too high in moisture or too high in fat. Examples of materials with which the present extractor is designed for use are finely divided lignite (for Montan wax extraction), rice bran, hops, animal fat where the fat content of the meat scrap would be in excess of about 40%, etc. Oil seeds, for example, may be processed to screen the coarser material which may be processed through a conventional percolation extractor and the fine material processed through the present immersion extractor to increase the overall oil recovery and capacity of the plant. Similarly, in the case of lignite, the coarser material obtained by screening may be processed through a percolation extractor and the fine material would be processed in the present immersion extractor.

2. Description of Prior Art

Solvent immersion extractors are shown in U.S. Pat. Nos. 1,826,945; 2,227,605; and 2,703,274.

Of the three patents noted, the most pertinent is Swallen et al, U.S. Pat. No. 2,227,605, disclosing an apparatus for extracting zein (the alcohol soluble constituent of corn protein) from gluten meal using an alcoholic solvent and a series of settling vessels for the solvent through which the meal is moved by a series of conveyors. Each of the settling vessels is preceded by a mixing vessel having a rotating agitator for mixing the solid material with the solvent, the arrangement being that the mixture of solids and solvent thus made into a flowable mixture overflows a weir separating the mixing and settling chambers for deposit in the settling chamber. A drag conveyor is used to move the solid materials through the settling chamber and up and over an inclined bottom wall containing a screen for permitting solvent to drain back into the chamber. Each of the chambers has its own conveyor which returns overhead to re-enter at the opposite side of the chamber in an endless configuration. One of the disadvantages of the Swallen structure is that the drag conveyor moves up through the settling chamber on an inclined path and as it does so disturbs and agitates the surface of the miscella (alcohol and dissolved zein). A solvent immersion extractor depends upon the solid portion being heavier than the miscella so that it will settle to the bottom of the settling chamber and at the same time the miscella will float to the top of the solvent bath from where it is decanted. It is, accordingly, most important and forms a feature of the present invention that the surface from which the miscella is decanted is both clean and quiescent. Swallen et al depends on the obtaining of a homogenous mix overflowing the weir of the mixing chamber—a system which would not work with lignite where the heavy particles, including sand, would accumulate on the bottom.

SUMMARY OF THE INVENTION

The solvent immersion extractor of the present invention comprises a plurality of side-by-side settling chambers and a single drag conveyor which moves successively through the chambers and partitioning structure providing well defined entryways and exitways for the conveyor into and from the chambers while insuring the maintenance therebetween of a clean quiescent miscella surface. Baffling means are also used on the return leg of the conveyor for diverting solid material which may be released therefrom away from the quiescent surface and into one of the entryways.

Another and important feature of the present invention is the incorporation within what is basically an immersion extractor, of a percolation extractor and the inherent advantages provided thereby. The present apparatus combines the best features of the immersion-type extractor with the percolation-type extractor.

Another feature of the present invention is to provide an extractor of the character described which may be readily and thoroughly cleared of solid material at the end of a run.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

BRIEF DESCRIPTION OF THE DRAWING

The drawing is a front elevation, in a somewhat diagrammatic form and with the front wall removed, of a solvent immersion extractor constructed in accordance with the present invention.

DETAILED DESCRIPTION OF THE INVENTION

With reference to the accompanying drawing, the solvent immersion extractor of the present invention comprises, briefly, a structure providing a plurality of adjacent chambers 6, 7 and 8 for liquid solvent for extracting the desired component from solid material immersed in the solvent in the chambers; means 11, 12, 13, 14, 15 and 16 partitioning off substantially vertical entryways 21, 22 and 23 at one side of each of chambers 7–8, and substantially vertical exitways 26, 27 and 28 at the opposite side of the chambers, the partitioning means being effective to provide quiescent solvent surfaces 31, 32 and 33 between each pair of entryways and exitways; a continuous conveyor 36 for displacing the material through the chambers and being mounted for downward movement through entryways 21–23 and for upward movement through exitways 26–28 without disturbing the quiescent surfaces 31-33, conveyor 36 having a return leg 38 overhead of chambers 6-8; baffle means 41 mounted between surfaces 31-33 and return leg 38 and formed to divert falling solid material away from surfaces 31-33 and into one of the entryways 21-23; and the housing 43 providing the several chambers also including outlets 46, 47 and 48 on one side thereof at liquid levels 31-33 for decanting the miscella from the clean miscella surfaces. As will be observed from the drawing, partitioning means 11-16 extends from above surfaces 31-33 well down into the interior of chambers 6-8 and thus establish solvent columns isolated except at their bases from the fluid material in the chambers. Accordingly, the conveyor may move through these columns without significantly disturbing surfaces 31-33, and of particular importance any solid material falling off of the conveyor in the exitways will be deposited on the columns effectively shielded away from surfaces 31-33. Preferably and as here shown, the chambers are formed with arcuate bottoms and the partitioning walls making up the entryways and exitways 21-23 and 26-28 define elongated passageways; and the conveyor is formed with flights 56 which are mounted and dimensioned for movement through the passageways with the planes of the flights substantially perpendicular to the longitudinal axes of the passageways. At the same time, the conveyor is entrained about the sheaves 57, 58 and 59 for movement of flights 56 around an arcuate path conforming to bottoms 51-53 and with the flights supported substantially perpendicular to the container bottoms. As here shown, housing 43 is composed of a top wall 61, a bottom wall 62, end walls 63 and 64, a rear wall 65 and a front wall which is removed to show the interior parts. Chamber defining walls 67, 68 and 69 extend between the front and rear walls of the housing and walls 67 and 69 cooperate with end walls 63 and 64 to provide individually sealed chambers. Likewise, partition walls 11-16 and 41 extend between the front and rear walls to form their respective compartments and conveyor flights 56 similarly extend into proximity to the front and rear walls to most effectively drive the solvent and solid material mash through the chambers and the entryways and exitways connected thereto. It is desired that the vertical legs of the conveyor flights in the several exitways fit closely to the surrounding casing so as to most effectively transfer the mash from one chamber to the next. The liquid tends to drain from the mash as it is elevated and is permitted to return to the solvent column in the exitway via small clearance between the flights and the surrounding walls forming the exitway.

Solid material containing the component to be extracted is fed into the apparatus via a hopper 71 and feed conveyor 72 to a downwardly inclined chute 73 mounted on end wall 63 for delivery of material into the entryway 21 of the first stage where it is carried downwardly by conveyor flights 56 into chamber 6. A solvent delivery conduit 76 is connected to the feed conveyor for mixing the solid material with solvent as the two are delivered to chute 73 for passage into the first stage. Conduit 76 is here part of nozzle 77 and is connected by solvent line 78 to the outlet of a pump 109.

Another feature of the present invention is the incorporation within what has been heretofore described as an immersion extractor of a percolation extractor and the obtaining of the inherent advantages of this type of structure. This is accomplished by carrying the final discharge of solid material via conveyor leg 38 over a drainage support 81 and at the same time applying to the material fresh solvent for percolation therethrough. As here shown, support 81 comprises a series of parallel bars extending in the direction of conveyor travel with the slots between the bars permitting drainage therethrough of solvent leaching through the solid material carried by the conveyor. Fresh solvent 82 is applied to the solid material by a spray head 83 mounted at the upstream end of drainage support 81. Preferably, the drainage screen slopes upwardly slightly so as to prevent solvent from running into the spent solids discharge conveyor 86 positioned at the downstream end of the drainage support. Solids which are partially dried on the drainage support, drop onto discharge conveyor 86, here shown as a screw type, for movement out of the housing to a desolventizer. A pan 87 here forming part of the aforementioned baffle means 41 underlies the drainage support 81 for directing percolated solvent to entryway 23 of the final stage. Fresh solvent is added at the upper end of pan 87 by a spray head 88 which is connected by conduit 89 to spray head 83 and to a fresh solvent source, spray head 88 functioning to wash the fines deposited on pan 87 back into the entryway of the final stage. Accordingly, fresh and most potent solvent is deposited on and percolated through the substantially spent solid material to pick up the final bit of extractable component. In this operation, pan 87 cofunctioning with the partitioning means above described prevent any of the solid material from dropping onto and disturbing the quiescent miscella surfaces 31-33 in the several chambers. Similarly, partition means 41 underlies the endless conveyor as it passes from discharge conveyor 86 into the intake passage of the initial stage so that any solid material entrained on the conveyor and dropping therefrom will be diverted away from miscella surface 31 in the initial stage and be carried into the intake passage of the input stage.

Decanting of the miscella is here effected by outlets 46-48 formed in box-like structures 91, 92 and 93 mounted on rear wall 65 in registration with openings 46-48 and having outlets 96, 97 and 98 connected to drain conduits 101, 102 and 103, respectively. Decanted miscella is advanced from stage to stage in a reverse direction to the flow of material through the extractor. For example, drain conduit 103 of the final stage is connected to the intake of pump 106 which has its discharge connected to conduit 107 leading to a solvent spray head 108 positioned above entryway 22 of the second stage. Drain conduit 102 of the second stage is connected by pump 109 to nozzle 77 discharging miscella into the intake chute 73 of the first stage. Drain conduit 101 is connected to pump 111 which is, in turn, connected to conduit 112 for conducting the rich miscella to the evaporator for recovery of the solvent and extractable component. Additionally, drain openings 116, 117 and 118 are provided at the bottom of chambers 6-8 for draining the miscella at the end of a run. The present apparatus affords a unique advantage in clearing itself of solid material at the end of a run in the following manner. The flow of solid material through feed conveyor 72 and chute 73 is stopped. The conveyor continues to move and fresh solvent is supplied to spray heads 83 and 88 until the last of the main body of solid material is removed by discharge conveyor 88. The flow of fresh solvent is then stopped and conveyor operation continued until substantially all of the solid matter is removed from the system whereupon the solvent may be pumped out. This is here effected by first opening a valve 121 in conduit 122 leading from drain opening 118 to the intake side of pump 106, thus causing evacuation of the miscella from the third stage and delivering it to the second stage. When overflow ceases at opening 47, a valve 123 is opened in conduit 124 connecting drain 117 to the intake side of pump 109 for transfer of the miscella out of the second stage and into the intake of the first stage. When overflow from opening 46 ceases, a valve 126 is opened in conduit 127 leading from drain 116 to the intake side of pump 111 for transfer of the final miscella in the system from the first stage to the evaporator, via conduit 112.

While the present extractor is illustrated and described as a three stage extractor, it will be understood that more or less stages may be assembled in the manner illustrated. The conveyor illustrated more or less diagrammatically in the drawing is a standard drag conveyor composed of drive chains and flights.

What is claimed is:

1. An immersion extractor for solid material containing an extractable component comprising:

means providing a plurality of adjacent chambers for liquid solvent for extracting said component from said material and for maintaining a solvent level in said chambers;

means for partitioning off a substantially vertical entryway at one side of each of said chambers and a substantially vertical exitway at the opposite side of each of said chambers maintaining a quiescent solvent surface therebetween;

a continuous conveyor for displacing said material through said chambers and being mounted for downward movement through said entryways and for upward movement through said exitways without disturbing said quiescent surface and having a return leg overhead of said chambers;

baffle means mounted between said quiescent solvent surface and said return leg and formed to divert falling solid material away from said quiescent surface and into one of said entryways; and said first-named means including an outlet for decanting said solvent at said quiescent surface.

2. The extractor of claim 1, said partitioning means defining solvent columns within said chambers at said exitways whereby solvent released from said conveyor in said exitways will be deposited on said columns.

3. The extractor of claim 2, said partitioning means comprising:

walls defining elongated passageways for said entryways and exitways; and said conveyor comprising flights mounted and dimensioned for movement through said passageways with the planes of said flights substantially perpendicular to the longitudinal axes of said passageways.

4. The extractor of claim 3, said chambers being formed with arcuate bottoms and said passageways being positioned substantially tangentially to said bottom; and means supporting said conveyor for arcuate movement over said chamber bottoms and for substantially rectilinear movement in said passageways.

5. The extractor of claim 1, said return leg being mounted for movement of said material over a drainage support;

means applying solvent to said material on said drainage support for percolation of solvent therethrough;

means underlying said drainage support for directing percolated solvent to one of said entryways; and material discharge means mounted to receive material from said conveyor downstream of said drainage support.

6. The extractor of claim 5, said penultimate means directing said percolated solvent to the entryway of the chamber first upstream from said return leg.

* * * * *